12 United States Patent Office 3,507,879
Patented Apr. 21, 1970

3,507,879
PROCESS FOR PREPARING INDOLYL-3-ACETONITRILE
Manfred Maurer, Dirmstein uber Frankenthal, Pfalz, Ludwig Rappen, Duisburg-Meiderich, Gerd Busse, Krefeld, and Winfried Orth, Schifferstadt, Germany, assignors to Rutgerswerke und Teerverwertung Aktiengesellschaft, Frankfurt am Main, Germany
No Drawing. Filed Jan. 4, 1968, Ser. No. 695,586
Claims priority, application Germany, Jan. 12, 1967, R 45,041
Int. Cl. C07d 27/56
U.S. Cl. 260—319.1                                5 Claims

ABSTRACT OF THE DISCLOSURE

Indolyl-3-acetonitrile is prepared in a single-stage process by alkylation of dialkyl-skatole-amine in aqueous suspension and direct reaction with alkali cyanide of the resulting trialkylskatyl-ammonium compound in the presence of an inert solvent, in which indolyl-3-acetonitrile is well soluble and which can be added prior to or after the reaction with alkali cyanide.

---

It has been known that indolyl-3-acetonitrile can be prepared by reacting dimethylskatylamine (Gramine) with anhydrous hydrogen cyanide in an autoclave at 150° C.

It has also been known to prepare indolyl-3-acetonitrile by reacting trialkylskatyl-ammonium compounds with alkali cyanides. In this preparation, first dialkyl-skatyl-amines are alkylated in an organic solvent, the trialkylskatyl-ammonium compounds formed in this reaction are isolated and converted by reaction with an alkali cyanide into indolyl-3-acetonitrile, in a second process step.

According to another procedure, in which both of said reactions are carried out in one stage, alkylation of the dialkylskatyl-amines is carried out in methanol and subsequently the resulting reaction mixture is reacted with an aqueous alkali-cyanide solution. In this process only moderate yields are obtained.

The main object of the present invention is the preparation of indolyl-3-acetonitrile from dialkylskatyl-amines in a single process stage, i.e. without isolation of the trialkylskatyl-ammonium compounds, with the same excellent yields as in the two-stage process, in which the trimethyl-skatyl-ammonium compound must be isolated. Other objects and the advantages of the invention will be apparent from the following description and the appended claims.

Said main object of the present invention is attained by carrying out alkylation of the dialkylskatyl-amine in aqueous suspension thereof and adding to the reaction mixture prior to or after the reaction with alkali cyanide an inert solvent which is substantially not miscible with water and in which indolyl-3-acetonitrile is well soluble. Due to carrying out the alkylation of the dialkyl-skatyl amines in aqueous suspension, in which said amines are widely insoluble, the undesired side-reaction in solution of the already formed trialkylskatyl-ammonium compounds with unreacted dialkylskatyl-amines to dialkyl-skatyl-ammonium compounds is prevented. Due to this alkylation of the dialkylskatyl-amines takes place with almost quantitative yield.

In order to avoid losses due to the formation of an emulsion during, or after, the reaction of the trialkyl-skatyl-ammonium compounds with alkali cyanide, it has been found preferable to add to the reaction mixture an inert solvent, in which the indolyl-3-acetonitrile is well soluble. Examples of such solvents are benzene, toluene, xylene, halogenated hydrocarbons, e.g. carbon tetrachloride ethers, e.g. diisopropylether. Such solvent may be added prior to, or after, the reaction with alkali cyanide.

The indolyl-3-acetonitrile obtained by the process of the present invention has a high degree of purity and can be used in conversions into other compounds without any purification, for example in catalytic hydrogenation to triptamine.

The following examples describe some preferred embodiments of the invention, to which the invention is not limited.

EXAMPLE 1

696 g. (4 mols) of pulverized dimethylskatyl-amine (Gramine) are suspended in 3.5 liters of water and caused to react under cooling quickly enough with 424 ml. (4.4 mol) of dimethyl sulfate so that the reaction temperature does not exceed 30° C. Subsequently a solution of 400 g. (8.2 mol) sodium cyanide in 800 ml. of water is added under quick heating to 65° C., and this temperature is maintained for about one hour. Subsequently, the reaction mixture is cooled to ordinary room temperature, one liter of toluene is added, the aqueous and the organic phase are separated and the organic phase is purified first by extraction with water and thereafter with dilute hydrochloric acid. After removal of the added organic solvent, 570 g. of indolyl-3-acetonitrile having a purity of about 97%, are obtained. The yield amounts to 93.5% calculated on the reacted Gramine.

EXAMPLE 2

348 g. (2 mol) of pulverulent dimethylskatyl-amine (Gramine) are suspended in 1.75 liter of water and reacted under cooling quickly enough with 212 ml. (2.2 mol) dimethylsulfate, so that the reaction temperature does not exceed 30° C. Subsequently, 1 liter of carbon tetrachloride and 200 g. (4.1 mol) sodium cyanide dissolved in 400 ml. water were added, the reaction mixture is quickly heated to 80° C. and allowed to remain at this temperature for about one hour. Further processing is carried out in the manner described in the above Example 1, but without further addition of solvent. 265 g. of indolyl-3-acetonitrile of a purity of about 97% are thus obtained. The yield amounts to 92.8% calculated on the reacted Gramine.

EXAMPLE 3

404 g. (2 mol) of diethylskatyl-amine are suspended in 1.75 liters of water and reacted under cooling quickly enough with 212 ml. (2.2 mol) dimethylsulfate so that the reaction temperature does not exceed 30° C. Subsequently, 200 g. (4.1 mol) of sodium cyanide dissolved in 400 ml. of water are added and the reaction mixture is quickly heated to 70° C. and allowed to remain at this temperature for about 1 hour. Further processing is carried out in the manner described in the above Example 1. In this manner 280 g. of indolyl-3-acetonitrile having a purity of about 97% are obtained. The yield amounts to 92% calculated on reacted diethylskatyl-amine.

EXAMPLE 4

To a suspension of 174 g. (1 mol) of dimethylskatyl-amine (Gramine) in 800 ml. of water 156 g. (1.1 mol) methyliodide is added under cooling in such manner that the temperature of the mixture does not exceed 30° C. Subsequently 0.5 liter of diisopropylether and 100 g. (2.04 mol) of sodium cyanide dissolved in 200 ml. of water are added. The reaction is completed by heating to 75° C. and allowing the reaction mixture to remain at this temperature for one hour. After cooling to ordinary room temperature and separation of the ether layer, the organic layer is purified first by extracting it with water and then with dilute hydrochloric acid. After the removal of the solvent 109 g. of indolyl-3-acetonitrile of a purity of about 98% are obtained. The yield amounts to 93% calculated on reacted Gramine.

It will be understood that the present invention is not limited to the steps, proportions, and materials specifically described above and can be carried out with various modifications.

Thus, in the alkylation of the dialkylskatylamines in aqueous suspension, 100 g. of the pulverulent material are suspended in 440–500 g. of water and alkylation is carried out at temperatures not exceeding 30° C. The mol-proportion of sodium cyanide used in the treatment of 1 mol of dialkylskatylamine is 2.04. Variations of the kind and the amount of the inert solvent for indolyl-3-acetonitrile, are shown in the above examples. The dilute hydrochloric acid may have a concentration of 3 to 7% by weight of HCl. The temperature applied upon the addition of the alkalicyanide is in the range between 65 and 80° C. The term "room temperature" is used herein to denote a temperature of 18–25° C. Separation of the aqueous and solvent layers is brought about by deposition and the solvent is removed from the solvent layer by distillation, eventually under vacuum. In carrying out the process of the invention, as alkylating agents for example dimethylsulfate and methylhalides can be used. Instead of sodium cyanide an equivalent amount of potassium cyanide can be used.

The parts and percent stated herein are by weight if not otherwise stated.

What is claimed is:
1. A process for preparing indolyl-3-acetonitrile, comprising:
(a) reacting in aqueous suspension a dialkylskatylamine, in which the alkyl radical is selected from the group consisting of methyl and ethyl radicals, with an alkylating agent selected from the group consisting of dimethylsulfate and methyl halides, under cooling to a temperature not exceeding 30° C. to form a trialkylskatyl-ammonium compound, and
(b) directly reacting the trialkylskatyl-ammonium compound formed in (a) with an aqueous solution of alkalicyanide at a temperature in the range of 65–80° C., said steps (a) and (b) being carried out in a one stage process.

2. A process as claimed in claim 1, in which the product of reaction between trialkylskatyl-ammonium and the alkalicyanide solution is, in which after the reaction with alkali cyanide, the reaction mixture is heated to a temperature in the range of 65-80° C. and then cooled to ordinary room temperature; then adding to the reaction mixture an inert organic solvent which is not miscible with water, which is selected from the group consisting of benzene, toluene, xylene, carbon tetrachloride and diisopropylether, and in which indolyl-3-acetonitrile is well soluble; separating the organic solvent phase from the aqueous phase and removing said solvent from the indolyl-3-acetonitrile dissolved therein.

3. A process as claimed in claim 2, in which the inert organic solvent is added to the reaction mixture prior to the reaction with alkali cyanide.

4. A process as claimed in claim 2, in which the inert organic solvent phase separated from the aqueous phase is purified by axtraction with water and subsequently with dilute hydrochloric acid.

5. A process as claimed in claim 2, in which the inert organic solvent is added to the reaction mixture after the reaction with alkali cyanide.

References Cited
FOREIGN PATENTS
888,425   1/1962   Great Britain.

OTHER REFERENCES
Potts et al.: J. Chem. Soc., p. 2679 (1955).
Snyder et al., J. Am. Chem. Soc., vol. 66, pp. 200–204 (1944).

ALEX MAZEL, Primary Examiner

J. A. NARCAVAGE, Assistant Examiner

U.S. Cl. X.R.
760—376.15